(12) United States Patent
Choi

(10) Patent No.: US 11,753,542 B2
(45) Date of Patent: Sep. 12, 2023

(54) THERMOPLASTIC RESIN COMPOSITION

(71) Applicants: Hyundai Motor Company, Seoul (KR); Kia Motors Corporation, Seoul (KR)

(72) Inventor: Seung Woo Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 220 days.

(21) Appl. No.: 17/136,386

(22) Filed: Dec. 29, 2020

(65) Prior Publication Data

US 2021/0355320 A1    Nov. 18, 2021

(30) Foreign Application Priority Data

May 15, 2020  (KR) .................. 10-2020-0058324

(51) Int. Cl.
| | |
|---|---|
| *C08L 77/06* | (2006.01) |
| *C08L 23/06* | (2006.01) |
| *C08L 23/08* | (2006.01) |
| *C08L 23/16* | (2006.01) |
| *C08L 51/06* | (2006.01) |
| *C08L 77/02* | (2006.01) |
| *C08K 3/22* | (2006.01) |
| *C08K 3/38* | (2006.01) |

(52) U.S. Cl.
CPC ............... *C08L 77/06* (2013.01); *C08K 3/22* (2013.01); *C08K 3/38* (2013.01); *C08L 23/06* (2013.01); *C08L 23/0815* (2013.01); *C08L 23/16* (2013.01); *C08L 51/06* (2013.01); *C08L 77/02* (2013.01); *C08K 2003/222* (2013.01); *C08K 2003/2227* (2013.01); *C08K 2003/385* (2013.01); *C08K 2201/005* (2013.01); *C08L 2201/08* (2013.01); *C08L 2203/30* (2013.01); *C08L 2205/035* (2013.01); *C08L 2205/24* (2013.01); *C08L 2207/04* (2013.01)

(58) Field of Classification Search
CPC .................. C08L 23/00–18; C08L 51/00–085
See application file for complete search history.

(56) References Cited

U.S. PATENT DOCUMENTS

| | | | |
|---|---|---|---|
| 2013/0115401 A1 | 5/2013 | Doshi et al. | |
| 2020/0062957 A1 | 2/2020 | Seo et al. | |

FOREIGN PATENT DOCUMENTS

| | | | |
|---|---|---|---|
| JP | 2017088661 A | * | 5/2017 |
| WO | 2019195694 A1 | | 10/2019 |

OTHER PUBLICATIONS

2017088661 A machine translation (May 2017).*
K. Marchildon, "Polyamides—Still Strong After Seventy Years", Macromolecular Reaction Engineering, 2011, 5, 22-54.

* cited by examiner

*Primary Examiner* — Ana L. Woodward
(74) *Attorney, Agent, or Firm* — Fox Rothschild LLP

(57) ABSTRACT

Disclosed are a thermoplastic polyamide resin composition, a method for preparing the same and a molded article produced thereby. The molded article may have improved impact strength and heat resistance, produced from the thermoplastic polyamide resin composition including a nucleating agent containing an aromatic polyamide and a heat-dissipation filler, polyamide 66 and polyamide 6, thereby improving the speed of process and realize uniform crystallization.

14 Claims, No Drawings

THERMOPLASTIC RESIN COMPOSITION

CROSS-REFERENCE TO RELATED APPLICATION

This application claims under 35 U.S.C. § 119(a) the benefit of priority to Korean Patent Application No. 10-2020-0058324 filed on May 15, 2020, the entire contents of which are incorporated herein by reference.

TECHNICAL FIELD

The present invention relates to a thermoplastic polyamide resin composition, a method for preparing the same, and a molded article produced thereby. The molded article may be produced from the thermoplastic polyamide resin composition including a nucleating agent containing an aromatic polyamide and a heat-dissipation filler, polyamide 66 and polyamide 6 thereby improving the speed of the process and realize uniform crystallization and may have improved impact strength and heat resistance.

BACKGROUND

A polyamide composition for electric-wire-protecting parts used in a vehicle engine room should exhibit impact resistance and high elongation, as well as a heat deflection temperature to prevent deflection at an engine room temperature.

A non-reinforced polyamide 66 resin has been widely used in parts for use in a vehicle engine room parts owing to characteristics such as the high heat deflection temperature and rapid crystallization speed, but is unstable in terms of price and supply due to the limited number of polymerization companies. On the other hand, a polyamide 6 resin has drawbacks of a low crystallization rate and a relatively low heat deflection temperature, but has advantages of price and supply stability. Therefore, despite great deal of efforts to blend polyamide 6 with polyamide 66 to produce an economically efficient polyamide resin composition, inevitably, heat resistance decreases when a polyamide 6 resin, having relatively low heat resistance, is applied.

To date, polyamide 66/6 copolymer has been mainly used to impart impact resistance and high elongation to electric-wire-protecting parts, but this process includes polymerizing a base resin, and thus requires large-scale equipment and entails an increase in raw material prices. Some polyamide compositions using extrusions are also used, and blending using an extrusion process realizes a simple production process and relatively low raw material prices. However, it is known to be difficult to produce a homogeneous material having hybrid properties between polyamide 66 and polyamide 6. For example, a product in which a high content of polyamide 6 is blended with polyamide 66 has not been used due to the low heat deflection temperature thereof.

The above information disclosed in this section is only for enhancement of understanding of the background of the invention and therefore it may contain information that does not form the prior art that is already known in this country to a person of ordinary skill in the art.

SUMMARY

In one preferred aspect, provided is a homogeneous material having hybrid properties of polyamide 66 and polyamide 6.

In one preferred aspect, provided is a method for improving the molding cycle and increasing the crystallinity while including polyamide 66 and polyamide 6, having different crystallization temperatures.

In one preferred aspect, provided is a thermoplastic polyamide resin composition that includes polyamide 66 and polyamide 6 to provide excellent impact resistance and elongation properties as well as a high heat deflection temperature.

In one aspect, provided is a thermoplastic polyamide resin composition including a polyamide resin, an olefinic rubber, polyethylene, and a nucleating agent including aromatic polyamide and a heat-dissipation filler.

The term "polyamide resin" as used herein refers to a synthetic polymer formed of aliphatic or semi-aromatic polyamides. The polyamide resin is a thermoplastic resin formed of repeating units including aliphatic or aromatic groups which are linked by amide linkages that are formed by condensation reaction of amine and carboxylic acid.

The term "olefinic rubber" as used herein refers to a rubber or rubber-like olefin resin including or formed of long chain-like molecules that are capable of recovering their original shape after being stretched. Exemplary elastomer or rubber may include natural rubber, neoprene rubber, buna-s and buna-n rubber, which are modified or unmodified alkyl or aliphatic chains having carbon backbones linked together by single (C—C) or double (C=C) bonds.

The term "nucleating agent" as used herein refers to a substance or particle that accelerates its rate of crystallization of surrounding material (e.g., resin). The nucleating agent may have different physical or chemical properties on its surface from the other surrounding material, which may trigger crystallization or nucleation.

The term "filler" as used herein refers to a material added to a matrix or an admixture to improve properties but not to react or be reactive with any other compounds or chemicals in a surrounding matrix or admixture. The filler may be in a form of particles, fibers, or resin, and preferably, the filler may be particles. In certain embodiments, the filler may be added to a resin matrix to improve heat-dissipating characteristics.

The polyamide resin may include one or more from the group consisting of polyamide 66, and polyamide 6.

The olefinic rubber may include an olefinic rubber grafted with maleic anhydride.

The olefinic rubber may include one or more selected from the group consisting of an ethylene propylene copolymer, an ethylene alpha olefin copolymer.

The polyethylene may include polyethylene grafted with maleic anhydride.

The aromatic polyamide may have a glass transition temperature of about 120° C. or greater and a melting point of about 280° C. or greater.

The aromatic polyamide may include aromatic dicarboxylic acid.

The aromatic polyamide may include an amount of about 10 to 100 mol % of the aromatic dicarboxylic acid.

The aromatic dicarboxylic acid may include terephthalic acid.

The aromatic polyamide may include a copolymer, and the copolymer may include aliphatic polyamide including polyamide 66 or polyamide 6.

The heat-dissipation filler may include one or more selected from the group consisting of boron nitride (BN), aluminum nitride (AlN), magnesium oxide (MgO), and aluminum oxide ($Al_2O_3$).

The heat-dissipation filler may have a particle size of about 1 to 25 μon average.

The polyamide resin composition may suitably include an amount of about 78% to 90% by weight of the polyamide resin, an amount of about 5% to 12% by weight of the olefinic rubber, an amount of about 3% to 8% by weight of the polyethylene and an amount of about 1% to 2% by weight of the nucleating agent. All the % by weight are based on the total weight of the polyamide resin composition.

The thermoplastic polyamide resin composition may include an amount of about 0.5% to 1.0% by weight of the aromatic polyamide and an amount of about 0.5% to 1.0% by weight of the heat-dissipation filler.

In another aspect, provided is a method for preparing a thermoplastic polyamide resin composition, and the method may include preparing an admixture a polyamide resin, and preparing an admixture including an olefinic rubber, polyethylene, a nucleating agent, and the prepared polyamide resin. Preferably, the nucleating agent may include aromatic polyamide and a heat-dissipation filler.

The polyamide resin may suitably include polyamide 66 and polyamide 6.

The polyamide resin may suitably include polyamide 66 and polyamide 6 at a weight ratio of about 5:5 to 6:4.

The aromatic polyamide may be prepared by condensation polymerization between dicarboxylic acid and a diamine monomer.

In another aspect, provided is a molded article including the thermoplastic polyamide resin composition as described herein.

The molded article may have an Izod impact strength of about 65 KJ/m$^2$ or greater, a tensile elongation of about 90% or greater, and a heat deflection temperature of about 170° C. or greater.

Other aspects of the invention are discussed infra.

DETAILED DESCRIPTION

The objects described above, as well as other objects, features and advantages, will be clearly understood from the following preferred embodiments with reference to the attached drawings. However, the present invention is not limited to the embodiments, and may be embodied in different forms. The embodiments are suggested only to offer thorough and complete understanding of the disclosed context and to sufficiently inform those skilled in the art of the technical concept of the present invention.

Like reference numbers refer to like elements throughout the description of the figures. In the drawings, the sizes of structures may be exaggerated for clarity. It will be understood that, although the terms "first", "second", etc. may be used herein to describe various elements, these elements should not be construed as being limited by these terms, which are used only to distinguish one element from another. For example, within the scope defined by the present invention, a "first" element may be referred to as a "second" element, and similarly, a "second" element may be referred to as a "first" element. Singular forms are intended to include plural forms as well, unless the context clearly indicates otherwise.

It will be further understood that the term "comprises" or "has", when used in this specification, specifies the presence of stated features, numbers, steps, operations, elements, components or combinations thereof, but does not preclude the presence or addition of one or more other features, numbers, steps, operations, elements, components, or combinations thereof. In addition, it will be understood that, when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should modify all the numbers, figures and/or expressions.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in the description, these ranges are continuous and include all numbers from the minimum to the maximum including the maximum within the ranges unless otherwise defined. Furthermore, when the range refers to an integer, it includes all integers from the minimum to the maximum including the maximum within the range, unless otherwise defined.

It should be understood that, in the specification, when a range is referred to regarding a parameter, the parameter encompasses all figures including end points disclosed within the range. For example, the range of "5 to 10" includes figures of 5, 6, 7, 8, 9, and 10, as well as arbitrary sub-ranges, such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include numbers such as 10%, 11%, 12% and 13% as well as 30%, and any sub-ranges, such as ranges of 10% to 15%, 12% to 18%, or 20% to 30%, as well as any numbers, such as 10.5%, 15.5% and 25.5%, between appropriate integers that fall within the range.

The present invention relates to a thermoplastic polyamide resin composition ("polyamide resin composition"), a method for preparing the same and a molded article produced thereby.

Hereinafter, each category will be described separately.

Polyamide Resin Composition

The thermoplastic polyamide resin composition may include a polyamide resin, an olefinic rubber, polyethylene and a nucleating agent.

Polyamide Resin

The polyamide resin may include one or more selected from the group consisting of polyamide 66, and polyamide 6. Preferably, the polyamide resin may include both polyamide 66 and polyamide 6 in a blended state.

The thermoplastic polyamide resin composition preferably may include an amount of about 78 to 90% by weight of the polyamide resin based on the total weight of the polyamide resin composition.

The polyamide 66 and polyamide 6 may affect injection moldability and heat deflection temperature.

The polyamide resin preferably may include polyamide 66 and polyamide 6 at a weight ratio of about 5:5 to 6:4. When the ratio of the polyamide 66 is less than a weight ratio of about 5:5 or the ratio of polyamide 6 is greater than a weight ratio of 5:5, a decrease in heat deflection temperature may increase, and when the ratio of polyamide 66 is greater than the weight ratio of about 6:4 or the ratio of polyamide 6 is less than the weight ratio of about 6:4, resin flowability may be relatively low.

Olefinic Rubber

The olefinic rubber may include an olefinic rubber grafted with maleic anhydride. Preferably, the olefinic rubber may include one or more selected from the group consisting of an ethylene propylene copolymer, and an ethylene alpha olefin copolymer.

The thermoplastic polyamide resin composition may suitably include an amount of about 5% to 12% by weight of the olefinic rubber. When the olefinic rubber is present in an amount of less than about 5% by weight, the impact strength may be deteriorated, and when the olefinic rubber is present in an amount of greater than about 12% by weight, the decrease in the heat deflection temperature may increase.

Polyethylene

The polyethylene may include polyethylene grafted with maleic anhydride. Preferably, the polyethylene may include one or more selected from the group consisting of low-density polyethylene, linear low-density polyethylene, and high-density polyethylene.

The thermoplastic polyamide resin composition may include an amount 3% to 8% by weight of the polyethylene based on the total weight of the polyamide resin composition. When the polyethylene is present in an amount of less than about 3% by weight, the tensile elongation may be deteriorated, and when the polyethylene is present in an amount greater than about 8% by weight, the decrease in heat deflection temperature may increase.

Nucleating Agent

The polyamide resin composition preferably may include an amount of about 1 to 2% by weight of the nucleating agent, and the nucleating agent may suitably include aromatic polyamide and a heat-dissipation filler.

The aromatic polyamide preferably may have a glass transition temperature of about 120° C. or greater and a melting point of about 280° C. or greater. For example, the glass transition temperature may suitably be of about 125 to 140° C., and the melting point may suitably be of about 300° C. to 310° C.

Basically, the aromatic polyamide should be highly compatible with polyamide 66 and polyamide 6, and the aromatic polyamide may include one or more selected from the group consisting of amino acid, lactam, diamine, and dicarboxylic acid. Preferably, the aromatic polyamide may include an amount of about 10 mol % to 100 mol % of aromatic dicarboxylic acid. For example, the aromatic polyamide may suitably include 10 to 50 mol % of aromatic dicarboxylic acid.

The aromatic dicarboxylic acid may suitably include terephthalic acid.

The aromatic polyamide may suitably include a copolymer. The copolymer may include any one aliphatic polyamide of polyamide 66 or polyamide 6.

The polyamide resin composition may preferably include an amount of about 0.5% to 1.0% by weight of the aromatic polyamide. When the aromatic polyamide is present in an amount of less than about 0.5% by weight, the effect of improving the injection-molding cycle may be deteriorated, and when the aromatic polyamide is present in an amount greater than about 1.0% by weight, impact resistance and elongation may be deteriorated.

The heat-dissipation filler of the present invention may preferably include one or more selected from the group consisting of boron nitride (BN), aluminum nitride (AlN), magnesium oxide (MgO), and aluminum oxide ($Al_2O_3$).

The particle size of the heat-dissipation filler may preferably be about 1 to 25 μm on average.

The polyamide resin composition may preferably include an amount of about 0.5% to 1.0% by weight of the heat-dissipation filler, and when the heat-dissipation filler is present in an amount of less than about 0.5% by weight, an effect of increasing the heat deflection temperature may not be sufficiently obtained due to the decreased crystallization attributable to the heat dissipation effect, and when the heat-dissipation filler is present in an amount greater than about 1.0% by weight, problems of deteriorated impact strength and tensile elongation may occur due to the inorganic heat-dissipation filler.

The polyamide resin composition of the present invention may further include an additive, for example, an antioxidant, heat stabilizer, light stabilizer, lubricant, pigment or the like. However, the type or content of the additive in the present invention is not particularly limited, and any additive that can be commonly used in technical fields in which polyamide resins are handled can be satisfactorily used in the present invention.

Method of Preparing Polyamide Resin Composition

The method for preparing a thermoplastic polyamide resin composition may include preparing a polyamide resin and preparing an admixture including an olefinic rubber, polyethylene, a nucleating agent, the prepared polyamide resin. The nucleating agent may include aromatic polyamide and a heat-dissipation filler.

Hereinafter, each step will be described separately.

Preparing Polyamide Resin

The polyamide resin may preferably include polyamide 66 and polyamide 6, not in the form of a copolymer, but in a blended form. For example, covalent bonds may not be formed between the polyamide 66 and polyamide 6 polymers, but only a weak interaction between the two polymers occurs, so the polyamide resin composition may have the characteristics of each of the two polyamide polymers. The polyamide 66 and the polyamide 6 may be preferably mixed at a weight ratio of about 5:5 to 6:4 and may be incorporated in the polyamide resin.

Preparing Mixture

An admixture may be prepared by adding an olefinic rubber, polyethylene, aromatic polyamide and a heat-dissipation filler to the prepared polyamide resin including polyamide 66 and polyamide 6.

The aromatic polyamide may be prepared through condensation polymerization between dicarboxylic acid and a diamine monomer, wherein the diamine monomer may be aliphatic or aromatic.

The mixture may preferably be prepared by adding an amount of about 5% to 12% by weight of the olefinic rubber, an amount of about 3% to 8% by weight of the polyethylene, an amount of about 0.5% to 1.0% by weight of the aromatic polyamide and an amount of about 0.5% to 1.0% by weight of the heat-dissipation filler to an amount of about 78% to 90% based on the total weight of the polyamide resin.

Molded Article

The molded article may be produced by processing the thermoplastic polyamide resin composition. The thermoplastic polyamide resin composition may be injected, cooled and dried at an appropriate temperature for an appropriate time to produce a molded article.

The present invention may provide the effect of increasing the speed at which the thermoplastic polyamide resin composition is injected and hardened. In general, polyamide 6 has a lower crystallization temperature than polyamide 66, and thus they do not have the same state when mixed and hardened. For example, since polyamide 6 is less completely crystallized than polyamide 66, there is a problem in that the molding cycle is longer. However, the present invention may provide effects of improving the overall crystallinity due to the addition of the nucleating agent, thus shortening the molding cycle.

The molded article produced using the polyamide resin composition described herein may have an Izod impact strength of about 65 KJ/m$^2$ or greater, a tensile elongation of about 90% or greater, and a heat deflection temperature of about 170° C. or greater.

EXAMPLE

Hereinafter, the present invention will be described in more detail with reference to specific examples. However, the following examples are provided only for illustration of the present invention, and should not be construed as limiting the scope of the present invention.

Examples and Comparative Examples

A thermoplastic polyamide resin composition was prepared as shown in Table 1 below, dry-blended for 3 minutes, melt-mixed at a screw rotation speed of 300 rpm and at a pressure of −600 mmHg using a twin-screw extruder (diameter 40 mm, L/D 40/1) having a temperature set to 280° C., and then pelletized.

TABLE 1

|  | Example | | | | Comparative Example | | | | | | | |
|---|---|---|---|---|---|---|---|---|---|---|---|---|
| Item | 1 | 2 | 3 | 4 | 1 | 2 | 3 | 4 | 5 | 6 | 7 | 8 |
| A (wt %) | 85 | 85 | 80 | 78 | 90 | 80 | 85 | 85 | 83.8 | 84.8 | 85.3 | 85.3 |
| B (wt %) | 6 | 6 | 7 | 8 | 4 | 8 | 7 | 7 | 7 | 6 | 6 | 6 |
| C (wt %) | 8 | 7.5 | 11.5 | 12 | 6 | 12 | 7.5 | 7.5 | 7.5 | 7.5 | 8 | 7.5 |
| D (wt %) | 0.5 | 0.5 | 1.0 | 1.0 | — | — | — | 0.5 | 1.2 | 0.5 | 0.5 | 0.2 |
| E (wt %) | 0.5 | 1.0 | 0.5 | 1.0 | — | — | 0.5 | — | 0.5 | 1.2 | 0.2 | 1.0 |

A: Blend (weight ratio 6:4) of polyamide 66 (U4800, Invista Inc.) and polyamide 6 (HY2700, Haiyang Technology Co., Ltd.)
B: Low-density linear polyethylene grafted with maleic anhydride
C: Olefinic rubber grafted with maleic anhydride (Tafmer 5020C, Mitsui & Co., Ltd.)
D: Heat-dissipation filler (Boron nitride, 3M company)
E: Aromatic polyamide (PPA M1100, Evonik Industries AG)

Experimental Example 1 (Measurement of Mechanical Properties)

Specimens satisfying ISO standards with regard to tensile elongation, Izod impact strength and heat deflection temperature were produced from the prepared pellet using an injection-molding machine capable of providing a pressure of 150 tons and an injection temperature of 270° C.

The produced specimens were allowed to stand at a temperature of 23° C. and 50% relative humidity for 48 hours and were then measured in accordance with ISO standards, and the results are shown in Table 2 below.

TABLE 2

|  | Example | | | | Comparative Example | | | | | | | |
|---|---|---|---|---|---|---|---|---|---|---|---|---|
| Item | 1 | 2 | 3 | 4 | 1 | 2 | 3 | 4 | 5 | 6 | 7 | 8 |
| A (wt %) | 85 | 85 | 80 | 78 | 90 | 80 | 85 | 85 | 83.8 | 84.8 | 85.3 | 85.3 |
| B (wt %) | 6 | 6 | 7 | 8 | 4 | 8 | 7 | 7 | 7 | 6 | 6 | 6 |
| C (wt %) | 8 | 7.5 | 11.5 | 12 | 6 | 12 | 7.5 | 7.5 | 7.5 | 7.5 | 8 | 7.5 |
| D (wt %) | 0.5 | 0.5 | 1.0 | 1.0 | — | — | — | 0.5 | 1.2 | 0.5 | 0.5 | 0.2 |
| E (wt %) | 0.5 | 1.0 | 0.5 | 1.0 | — | — | 0.5 | — | 0.5 | 1.2 | 0.2 | 1.0 |
| Izod impact strength (KJ/m$^2$) | 72 | 70 | 68 | 65 | 50 | 75 | 72 | 70 | 75 | 69 | 65 | 74 |

TABLE 2-continued

|  | Example | | | | Comparative Example | | | | | | | |
| --- | --- | --- | --- | --- | --- | --- | --- | --- | --- | --- | --- | --- |
| Item | 1 | 2 | 3 | 4 | 1 | 2 | 3 | 4 | 5 | 6 | 7 | 8 |
| Tensile elongation (%) | 92 | 90 | 105 | 110 | 70 | 119 | 104 | 109 | 105 | 95 | 89 | 91 |
| Heat deflection temperature (° C.) | 178 | 179 | 176 | 181 | 80 | 71 | 135 | 93 | 173 | 174 | 140 | 169 |

\* Criteria for measurement
Izod impact strength (64 KJ/m² or more)
Tensile elongation (70% or more)
Heat deflection temperature (170° C. or more)
\* Measurement method
Izod impact strength (after specimen notch is formed, measured at 23 in accordance with ISO 180 Type A, the specimen size is 80 mm × 10 mm × 4 mm)
Tensile elongation (measured in accordance with ISO 527, specimen is prepared in accordance with ISO 3167 Type A, test speed is 5 mm/min)
Heat deflection temperature (measured in accordance with ISO 75, specimen size is 80 mm × 10 mm × 4 mm, stress is 0.45 MPa)

Experimental Example 2 (Injection-Molding Cycle Measurement—Internal Pressure Decrease Time)

An injection machine providing a pressure of 250 ton at an injection temperature of 270° C. was used. The measurement of the injection-molding cycle was performed by mounting a mold internal-pressure sensor, produced by Kistler Instrument Corporation, in a TV stand part mold and measuring, as a solidification time, the time taken until the internal pressure decreased to 0 bar, and the results are shown in Table 3 below.

TABLE 3

|  | Example | | | | Comparative Example | | | | | | | |
| --- | --- | --- | --- | --- | --- | --- | --- | --- | --- | --- | --- | --- |
| Item | 1 | 2 | 3 | 4 | 1 | 2 | 3 | 4 | 5 | 6 | 7 | 8 |
| A (wt %) | 85 | 85 | 80 | 78 | 90 | 80 | 85 | 85 | 83.8 | 84.8 | 85.3 | 85.3 |
| B (wt %) | 6 | 6 | 7 | 8 | 4 | 8 | 7 | 7 | 7 | 6 | 6 | 6 |
| C (wt %) | 8 | 7.5 | 11.5 | 12 | 6 | 12 | 7.5 | 7.5 | 7.5 | 7.5 | 8 | 7.5 |
| D (wt %) | 0.5 | 0.5 | 1.0 | 1.0 | — | — | — | 0.5 | 1.2 | 0.5 | 0.5 | 0.2 |
| E (wt %) | 0.5 | 1.0 | 0.5 | 1.0 | — | — | 0.5 | — | 0.5 | 1.2 | 0.2 | 1.0 |
| Internal pressure decrease time (sec) | 16 | 15 | 15 | 14 | 20 | 26 | 24 | 26 | 15 | 17 | 21 | 18 |

Experimental Example 3 (Injection-Molding Cycle Measurement-Spiral Flow)

The produced pellets were measured using an injection machine providing 150 tons of pressure at an injection temperature of 270° C. The filling depth of the resin was measured using a spiral flow mold, and the results are shown in Table 4 below. At this time, the thickness of the flow mold was 2 mm, the injection pressure and speed were 55 bar and 55 mm/sec, respectively, and the mold temperature was 25 sec.

TABLE 4

|  | Example | | | | Comparative Example | | | | | | | |
| --- | --- | --- | --- | --- | --- | --- | --- | --- | --- | --- | --- | --- |
| Item | 1 | 2 | 3 | 4 | 1 | 2 | 3 | 4 | 5 | 6 | 7 | 8 |
| A (wt %) | 85 | 85 | 80 | 78 | 90 | 80 | 85 | 85 | 83.8 | 84.8 | 85.3 | 85.3 |
| B (wt %) | 6 | 6 | 7 | 8 | 4 | 8 | 7 | 7 | 7 | 6 | 6 | 6 |

TABLE 4-continued

| Item | Example | | | | Comparative Example | | | | | | | |
|---|---|---|---|---|---|---|---|---|---|---|---|---|
| | 1 | 2 | 3 | 4 | 1 | 2 | 3 | 4 | 5 | 6 | 7 | 8 |
| C (wt %) | 8 | 7.5 | 11.5 | 12 | 6 | 12 | 7.5 | 7.5 | 7.5 | 7.5 | 8 | 7.5 |
| D (wt %) | 0.5 | 0.5 | 1.0 | 1.0 | — | — | — | 0.5 | 1.2 | 0.5 | 0.5 | 0.2 |
| E (wt %) | 0.5 | 1.0 | 0.5 | 1.0 | — | — | 0.5 | — | 0.5 | 1.2 | 0.2 | 1.0 |
| Spiral flow (mm) | 43 | 44 | 42 | 42 | 32 | 48 | 46 | 41 | 42 | 40 | 41 | 43 |

As shown in the above tables and description, the present invention may provide a homogeneous material having hybrid properties of polyamide 66 and polyamide 6.

In addition, the present invention may provide a method for improving the molding cycle and increasing the crystallinity while including polyamide 66 and polyamide 6, having different crystallization temperatures.

Further, the present invention may provide a thermoplastic polyamide resin composition that includes polyamide 66 and polyamide 6 and thus exhibits excellent impact resistance and elongation properties as well as a high heat deflection temperature.

The effects of the present invention are not limited to those mentioned above. It should be understood that the effects of the present invention include all effects that can be inferred from the description of the present invention.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A thermoplastic polyamide resin composition comprising:
   a polyamide resin;
   an olefinic rubber;
   polyethylene; and
   a nucleating agent comprising aromatic polyamide and a heat-dissipation filler,
   wherein the polyamide resin comprises polyamide 66 and polyamide 6,
   wherein the aromatic polyamide is prepared by condensation polymerization between an aromatic dicarboxylic acid and a diamine monomer,
   wherein the polyamide resin composition comprises an amount of about 78% to 90% by weight of the polyamide resin, an amount of about 5% to 12% by weight of the olefinic rubber, an amount of about 3% to 8% by weight of the polyethylene and an amount of about 1% to 2% by weight of the nucleating agent, the % by weight based on the total weight of the polyamide resin composition,
   wherein the thermoplastic polyamide resin composition comprises an amount of about 0.5% to 1.0% by weight of the aromatic polyamide and an amount of about 0.5% to 1.0% by weight of the heat-dissipation filler, the % by weight based on the total weight of the polyamide resin composition.

2. The thermoplastic polyamide resin composition according to claim 1, wherein the olefinic rubber comprises an olefinic rubber grafted with maleic anhydride.

3. The thermoplastic polyamide resin composition according to claim 1, wherein the olefinic rubber comprises one or more from the group consisting of an ethylene propylene copolymer, and an ethylene alpha olefin copolymer.

4. The thermoplastic polyamide resin composition according to claim 1, wherein the polyethylene comprises polyethylene grafted with maleic anhydride.

5. The thermoplastic polyamide resin composition according to claim 1, wherein the aromatic polyamide has a glass transition temperature of about 120° C. or greater and a melting point of about 280° C. or greater.

6. The thermoplastic polyamide resin composition according to claim 1, wherein the aromatic polyamide comprises an amount of about 10 to 50 mol % of the aromatic dicarboxylic acid based on 100 mol % of the total aromatic polyamide.

7. The thermoplastic polyamide resin composition according to claim 1, wherein the aromatic dicarboxylic acid comprises terephthalic acid.

8. The thermoplastic polyamide resin composition according to claim 1, wherein the aromatic polyamide comprises a copolymer,
   wherein the copolymer comprises polyamide 66 or polyamide 6.

9. The thermoplastic polyamide resin composition according to claim 1, wherein the heat-dissipation filler comprises one or more from the group consisting of boron nitride (BN), aluminum nitride (AlN), magnesium oxide (MgO), and aluminum oxide ($Al_2O_3$).

10. The thermoplastic polyamide resin composition according to claim 1, wherein the heat-dissipation filler has an average particle size of about 1 to 25 μm.

11. A molded article comprising a thermoplastic polyamide resin composition according to claim 1.

12. The molded article according to claim 11, wherein the molded article has an Izod impact strength of about 65 $KJ/m^2$ or greater, a tensile elongation of about 90% or greater, and a heat deflection temperature of about 170° C. or greater.

13. A method for preparing a thermoplastic polyamide resin composition comprising:
   preparing a polyamide resin; and
   preparing an admixture comprising an olefinic rubber, polyethylene, a nucleating agent, and the prepared polyamide resin,
   wherein the nucleating agent comprises aromatic polyamide and a heat-dissipation filler,
   wherein the polyamide resin comprises polyamide 66 and polyamide 6, wherein the aromatic polyamide is prepared by condensation polymerization between an aromatic dicarboxylic acid and a diamine monomer, wherein the polyamide resin composition comprises an amount of about 78% to 90% by weight of the polyamide resin, an amount of about 5% to 12% by weight of the olefinic rubber, an amount of about 3% to 8% by weight of the polyethylene and an amount of about 1% to 2% by weight of the nucleating agent, the % by weight based on the total weight of the polyamide resin composition, wherein the thermoplastic polyamide resin composition comprises an amount of about 0.5% to 1.0% by weight of the aromatic polyamide and an amount of about 0.5% to 1.0% by weight of the heat-dissipation filler, the % by weight based on the total weight of the polyamide resin composition.

14. The method according to claim 13, wherein the polyamide resin comprises polyamide 66 and polyamide 6 at a weight ratio of about 5:5 to 6:4.

* * * * *